US006909739B1

United States Patent
Eerola et al.

(10) Patent No.: US 6,909,739 B1
(45) Date of Patent: Jun. 21, 2005

(54) SIGNAL ACQUISITION SYSTEM FOR SPREAD SPECTRUM RECEIVER

(75) Inventors: Ville Eerola, Julkujärvi (FI); Tapani Ritoniemi, Peräseinäjoki (FI)

(73) Assignee: U-Nav Microelectronics Corporation, Irvine, CA (US)

(*) Notice: Subject to any disclaimer, the term of this patent is extended or adjusted under 35 U.S.C. 154(b) by 928 days.

(21) Appl. No.: 09/689,750

(22) Filed: Oct. 13, 2000

(30) Foreign Application Priority Data

Oct. 13, 1999 (FI) .............................................. 19992210
Sep. 29, 2000 (FI) .............................................. 20002154

(51) Int. Cl.$^7$ .............................................. H04B 1/69
(52) U.S. Cl. ........................ 375/152; 375/150; 375/149
(58) Field of Search ................................. 375/147, 152, 375/206, 319, 343, 355

(56) References Cited

U.S. PATENT DOCUMENTS

| 4,785,463 | A | * | 11/1988 | Janc et al. ................... 375/147 |
| 5,377,225 | A | | 12/1994 | Davis |
| 5,612,975 | A | * | 3/1997 | Becker et al. ............... 375/319 |
| 5,640,416 | A | * | 6/1997 | Chalmers .................... 375/147 |
| 5,654,991 | A | * | 8/1997 | Andren et al. .............. 375/355 |
| 5,761,239 | A | | 6/1998 | Gold et al. |
| 5,809,063 | A | * | 9/1998 | Ashe et al. ................. 375/141 |
| 5,903,595 | A | | 5/1999 | Suzuki |
| 5,920,589 | A | | 7/1999 | Rouquette et al. |
| 5,933,447 | A | | 8/1999 | Tran et al. |
| 5,999,561 | A | | 12/1999 | Naden et al. |
| 6,069,583 | A | * | 5/2000 | Silvestrin et al. ...... 342/357.01 |
| 6,141,372 | A | * | 10/2000 | Chalmers .................... 375/147 |
| 6,212,246 | B1 | * | 4/2001 | Hendrickson ............... 375/355 |
| 6,504,867 | B1 | * | 1/2003 | Efstathiou ................... 375/227 |
| 6,614,834 | B1 | * | 9/2003 | Meng et al. ................. 375/149 |

FOREIGN PATENT DOCUMENTS

| EP | 0 772 305 A2 | 5/1997 |
| EP | 0 855 796 A2 | 7/1998 |
| EP | 0 874 471 A2 | 10/1998 |
| EP | 0 886 386 A2 | 12/1998 |
| EP | 0 924 532 A2 | 6/1999 |
| EP | 0 924 871 A2 | 6/1999 |
| EP | 0 944 178 A2 | 9/1999 |
| EP | 0 772 305 A3 | 12/2001 |
| EP | 0 855 796 A3 | 7/2002 |
| EP | 0 886 386 A3 | 10/2002 |
| GB | 2 315 647 | 2/1998 |

OTHER PUBLICATIONS

Bert Gyselinckx et al. "A 4*2.5Mchip/s Direct Sequence Spread Spectrum Receiver with Digital IF and Integrated ARM6 Core." In:IEEE 1997 Custom Integrated Circuites Conference, pp. 461–464.
International Search report re: PCT/FI00/00879 mailed Feb. 7, 2001.

* cited by examiner

Primary Examiner—Stephen Chin
Assistant Examiner—Lawrence B. Williams
(74) Attorney, Agent, or Firm—Crowell & Moring LLP (57) ABSTRACT

A device for detecting a demodulated signal received by a spread spectrum receiver and converted into digital samples. The device is characterized by a matched filter for calculating the correlation between an incoming signal and at least one reference signal, an oscillator for generating a sampling frequency, and a sampling circuit for re-sampling the demodulated digital sample signal at the sampling frequency, which is such that the timing of samples of the references signals of the matched filter corresponds to the timing of a sample signal going from the sampling circuit to the matched filter. The device also includes a multiplier in which the sample signal is multiplied by a carrier replica generated locally before the sampling circuit or thereafter, to remove the carrier from the sample signal.

12 Claims, 6 Drawing Sheets

SIGNAL ACQUISITION SYSTEM FOR SPREAD SPECTRUM RECEIVER

BACKGROUND OF THE INVENTION

The invention relates to a spread spectrum receiver and particularly to an acquisition system for a signal received by the receiver.

A spread spectrum system is a telecommunications system in which the bandwidth used for transmitting a signal is substantially wider than is required for the data to be transmitted. The spectrum of the signal is spread in a transmitter by means of a pseudo-random spreading code, which is independent of the original data.

In direct sequence spread spectrum systems (DS-SS), a spectrum is spread to the available bandwidth by shifting the phase of the carrier in accordance with a pseudo-random spreading code. The bits of a spreading code are usually called chips as distinct from actual data bits.

Figure 1:
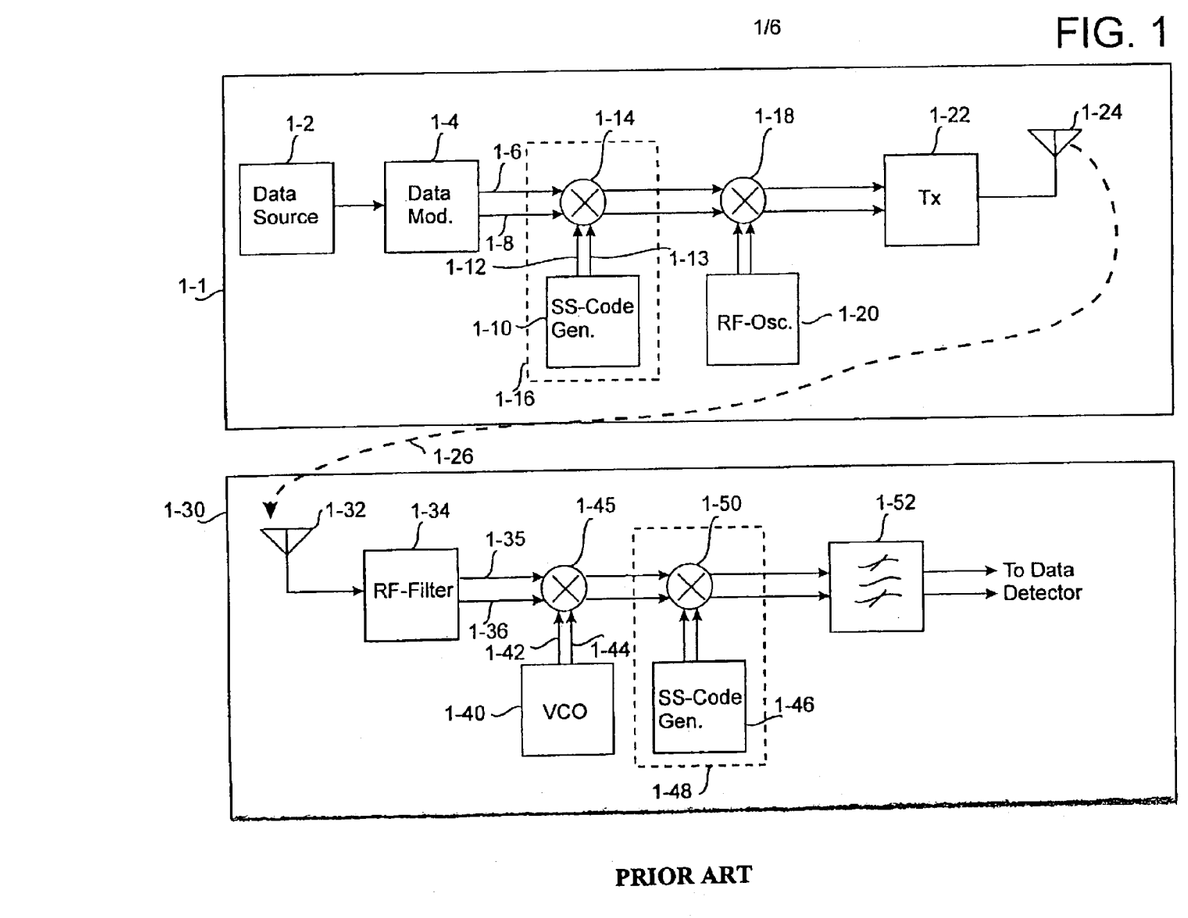
FIG. 1 illustrates a direct sequence-based spread spectrum system.

FIG. 1 shows a block diagram illustrating a direct sequence-based spread spectrum system. In the system, a signal of a data source 1-2 is first modulated in a data modulator 1-4 of a transmitter 1-1 whereupon a complex 1-6, 1-8 signal outcoming from the modulator 1-4 is modulated by multiplying said data modulated signal by a complex 1-12, 1-13 spreading code generated by a code generator 1-10 in a multiplier 1-14. A spreading code modulator 1-16 spreads the spectrum to be transmitted by means of the spreading code. A carrier generated by a high-frequency oscillator 1-20 is then modulated in a multiplier 1-18 by said data and code modulated signal, and an imaginary part 1-22 is removed from the signal to be transmitted. The transmitted signal propagates from an antenna 1-24 in the transmitter over a transmission path 1-26 to an antenna 1-32 in a receiver 1-30. In the receiver 1-30, a front end filter 1-34 separates an information signal from the entire frequency spectrum. A complex 1-35, 1-36 signal is mixed to a lower frequency by multiplying the signal by a complex 1-42, 1-44 signal generated by a voltage-controlled oscillator 1-40 in a multiplier 1-45.

In the receiver of a spread spectrum system, a reference signal, a code replica, which is an identical copy of said spreading code, is used in a despread modulator (spreading code demodulator) 1-48 to narrow the spectrum of an incoming signal. In FIG. 1, a code generator 1-46 generates said spreading code replica, which is correlated in a multiplier 1-50 with a received signal by said spreading code replica. If the code replica and the received code are the same and in phase, they correlate, and the transmitted data modulation can be restored to what it was before spreading. At the same time, different spurious signals are also spread. A band-pass filter 1-52, succeeding the despread modulator 1-48, lets the data modulation through, but removes most of the power of a spurious signal, which improves the signal-to-noise ratio of the received signal.

In order to enable the detection of transmitted data in a spread spectrum receiver, the code replica generated by the receiver has to be synchronized (acquisition) with the received code as accurately as possible, and said synchronization has to be maintained (signal tracking). The spreading code replica generated in the receiver thus has to be and stay in phase with the spreading code included in the received signal. For this reason, a special synchronization algorithm or unit is required for code synchronization, in addition to regular carrier and data synchronization. The speed of the acquisition, i.e. the time taken by the code replica to hit the right phase with the received code, is an important performance parameter of a spread spectrum system. Many methods have been developed for the acquisition, in addition to which the system may comprise different aids for the acquisition that are related to the transmitted signal.

Matched filters are devices whose output is a time-reversed replica, a copy of the desired incoming signal, when the input is an impulse. Thus the transfer function of a matched signal is a complex conjugate of the signal matched thereto. A matched filter can be implemented to operate either continuously or discretely. A matched filter calculates the correlation between a known reference signal and the signal to be measured, and gives a maximum output when the reference signal best corresponds to the incoming signal. For this reason, a matched filter is usable in signal acquisition in spread spectrum systems for searching for the right phase of the reference signal generated by a receiver. A matched filter may be shown to be the optimal way to identify signals from AWGN (Additive White Gaussian Noise) type of noise.

Figure 2:
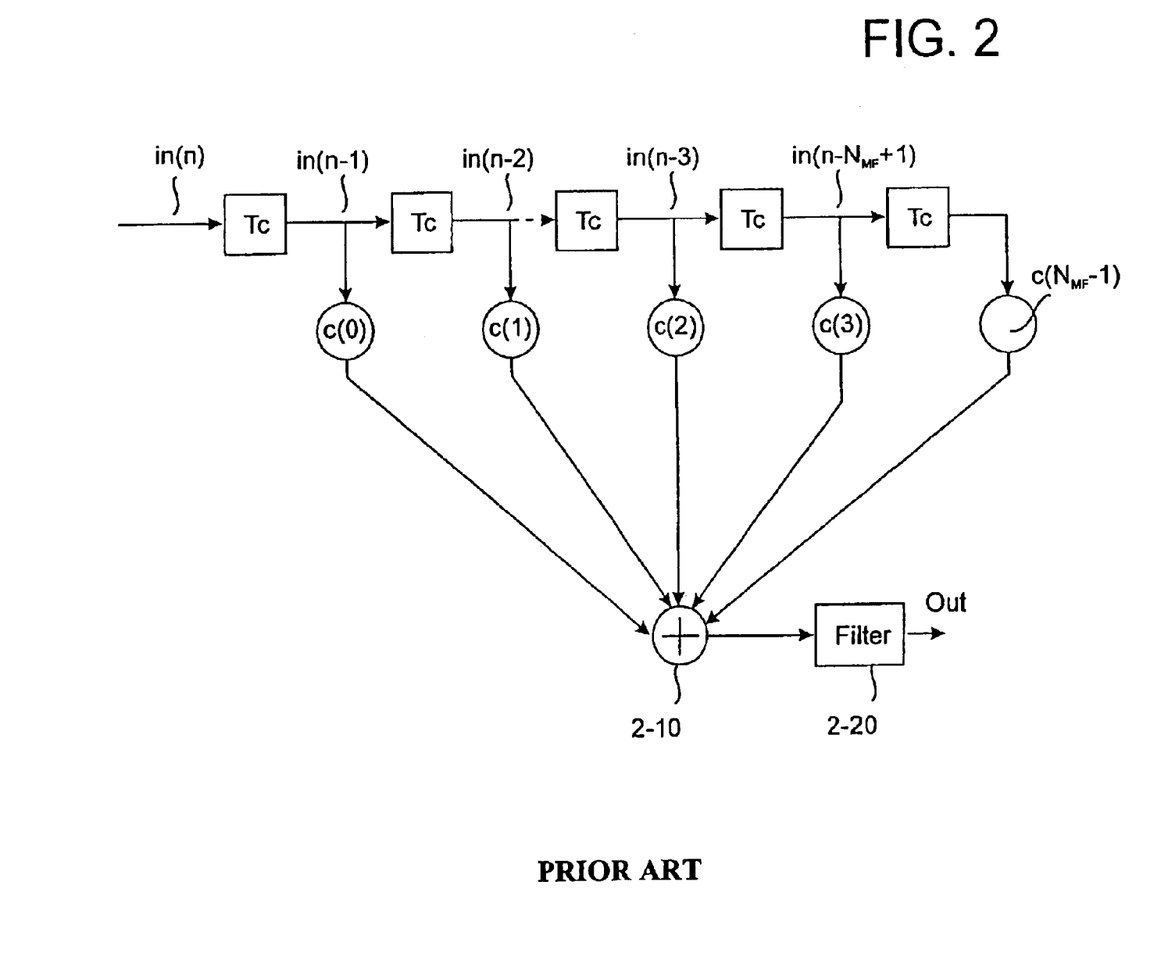
FIG. 2 shows a prior art implementation of a matched filter.

FIG. 2 shows a signal flow diagram of a feasible implementation of a matched filter. It consists of a delay line having intermediate outputs and of a passive filter matched to the waveform of a PRN (Pseudo Random Noise) chip. The output of the filter is matched to the basic pulse form of PRN spreading bits. In FIG. 2, in(n) represents a signal incoming to a filter and $in(n-1)$, $in(n-2)$ ... $in(n-N_{MF}+1)$ represent an incoming signal delayed by 1,2 to $N_{MF}+1$ delay elements Tc. $c(0)$, $c(1)$ ... $c(N_{MF}-1)$ represent coefficients by which the incoming signal, delayed in different magnitudes, is multiplied. After the multiplication, the signals are summed up in an adder 2-10 and the sum signal is filtered in a filter 2-20.

The use of a matched filter in the synchronization of spread spectrum systems is known for example from 'Spread Spectrum Communications Handbook', Marvin K. Simon et al., McGraw-Hill, 1994, pages 815 to 832. In a known matched filter, the filter is matched to one received signal at a time. This requires either the use of several matched filters or the search for one signal at a time, should the intention be to search for more than one signal.

When a band-pass type of signal is searched for with a matched filter from a received noisy signal, in known solutions the signal coming to the matched filter is preprocessed by multiplying it by a carrier estimate, which removes the frequency offset of the receiver. If the frequency offset is not known, the signal has to be searched for at different frequency offsets over the entire frequency inaccuracy range. Furthermore, a matched filter searches for the right phase of the reference signal generated by a receiver. A matched filter calculates the correlation between a known signal and the signal to be measured, i.e. generates a measure for the identity of the two signals. The outputs generated by the filter are typically non-coherently detected amplitude values.

Said measure is then compared with a set threshold value in order to decide if the two signals are in sync. In the simplest case, exceeding the threshold value means that the signal corresponding to the reference signal has been identified and that the spreading code of the identified signal is in phase with the reference signal. This information serves to initiate actual signal tracking and reception. If no identification occurs (the threshold value is not exceeded), the acquisition system changes the phase of the locally generated reference code or changes reference signals, whereupon the correlation is repeated. This continues until identification and synchronization are achieved, i.e. the reference signal corresponds best to the incoming signal. In this case the filter yields a maximum output. The tracking algorithm of the received signal is then initiated.

Figure 3:
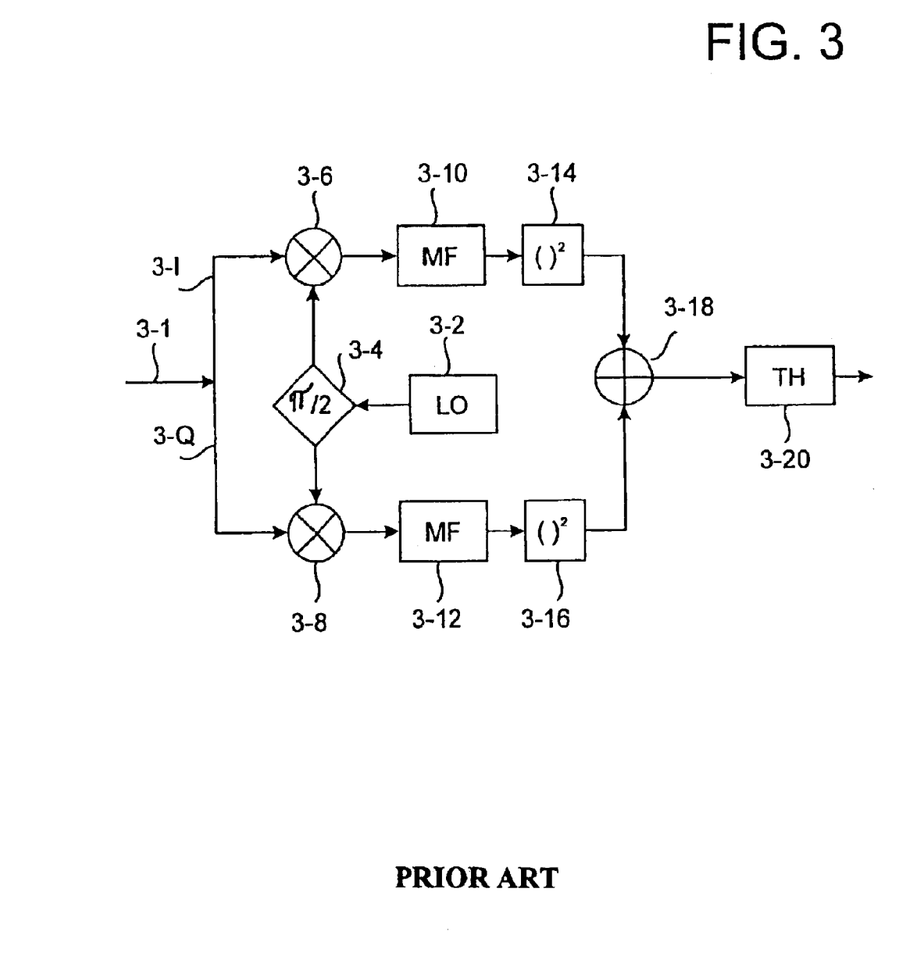
FIG. 3 shows a low-pass type of acquisition system using a matched filter.

Since in the acquisition system, a band-pass type of signal is searched, the matched filter has to be implemented either as a band-pass or an equivalent low-pass filter version. A low-pass type of acquisition system using a matched filter is shown in FIG. 3. Therein, a signal 3-1 incoming to identical, matched filters 3-10, 3-12 is divided into two parts, I and Q branches (I stands for In-phase, Q for Quadrature), and a signal that is generated by a local oscillator 3-2 and whose frequency can be substantially equal to the sum of the intermediate frequency of the receiver and the Doppler frequency of the received signal is used to multiply a signal of the 3-I branch in a multiplier 3-6. Before a signal of the 3-Q branch is multiplied in a multiplier 3-8, the phase of a signal generated by the local oscillator is shifted 90 degrees in a phase inverter 3-4.

After the multiplication of the incoming signal, signals incoming from 3-I and 3-Q branches are correlated in substantially identical matched filters 3-10 and 3-12 with a code replica generated in the receiver. The signals outcoming from the matched signals are then detected, i.e. the signals of both branches are squared in elements 3-14 and 3-16, and the squared signals are summed up in an adder 3-18 to obtain the square of the absolute value of a complex ingoing signal. A threshold value detector 3-20 then compares the value of the detected signal with a preset threshold value, a reference value. In the simplest case, exceeding the threshold value means that a signal corresponding to said reference signal has been detected and its spreading code is in phase with the stored reference signal. The information is used to initiate actual signal tracking and reception.

In the structures of generally known matched filters, the timing of a reference signal and an incoming signal is fixed at the planning stage, and cannot thus be adjusted accurately for different timings. This causes problems for tracking signals having a low signal-to-noise ratio, since the integration time required by them is long. This, in turn, requires accurate timing in the sampling of a matched filter, since the operation of a matched filter is subject to its reference signal being of the same length as a received signal in the time domain. In systems, in which the movement of a transmitter and receiver with respect to one another is fast, a Doppler shift, whose magnitude depends on the frequency of said signal component, is created in the carrier and the spreading code. Since the frequency of the spreading code depends on the Doppler shift, the frequency is not always exactly the same. This should also be accounted for in the acquisition system if the required integration time ($T_I$) is long. If the inaccuracy of the frequency exceeds $1/T_I$, the timing of the code changes more than one chip during integration, which prevents the acquisition system from operating.

The integration time of a DS-SS acquisition system is also limited by the modulation of the transmitted data. Generally, the integration cannot be continued over a transmitted data symbol unless the modulation can be compensated for before the integration. For example in the widely used BPSK modulation (Binary Phase Shift Keying), a change in a data bit causes a 180° phase change in the signal, corresponding to an inversion in its sign. This is why the integration over a data bit causes significant degradation to the signal. Consequently, when the integration time is longer than the length of a data symbol, coherent integration can no longer be used. The use of non-coherent integration only is not feasible, since non-coherent detection weakens the signal-to-noise ratio if the incoming signal-to-noise symbol is initially negative.

A pass-band or low-pass type of matched filter can be implemented either as analog or digital. The most usual way is to implement matched filters based on the analog technology, wherein the delay line is implemented by SAW (Surface Acoustic Wave) or CCD (Charge Coupled Device) technologies. However, at the manufacturing stage, said systems are built for only a given reference signal. The delay line of an analog discrete-timed matched filter can be implemented for example based on the SC technology (Switched Capacitor). However, a problem in this technology is aliasing, for example.

The advancement of the digital technology has also brought about digitally implemented matched filters. To implement the required rapid summing up of many values is difficult in a digital filter. In a matched filter, stored signal samples, multiplied by the reference signal along the length of the filter have to be calculated to generate one outcoming sample. Conventionally, this has been accomplished by summing up a small number of numbers at a time and by repeating the process during several clock cycles. This avoids the implementation of a multiple-input adder.

BRIEF DESCRIPTION OF THE INVENTION

The object of the invention is a device for correlating an incoming signal and a signal generated in a receiver, even if the signal-to-noise ratio of the received signal is low.

The object of the invention is achieved with a device for detecting a demodulated signal received by a spread spectrum receiver and converted into digital samples, the device being characterized by comprising:

a matched filter for calculating the correlation between an incoming signal and at least one reference signal;

an oscillator for generating a sampling frequency;

a sampling circuit for re-sampling said demodulated digital sample signal at said sampling frequency, which is such that the timing of the samples of the reference signals of the matched filter corresponds to the timing of a sample signal going from the sampling circuit to the matched filter; and a multiplier in which the sample signal is multiplied by a carrier replica generated locally before the sampling circuit or thereafter, to remove the carrier from the sample signal.

The re-sampling according to the primary embodiment of the invention allows the sampling of a received signal to be changed such that the timing of the received signal corresponds to the timing of the samples of the reference signals of the matched filter. This way, by adjusting the re-sampling frequency, timing problems typical of prior art filters can be avoided between a received signal and a reference signal, particularly in the case of signals having a low signal-to-noise ratio.

After multiplication with the carrier replica, the frequency of the signal hits the desired frequency, i.e. the intermediate frequency of the matched filter at the accuracy given by the bandwidth.

In an embodiment of the invention, a coherent integrator is arranged after the matched filter, the integrator integrating the correlation samples generated as outputs of the matched filter over an integration period that is longer than the length in time of the matched filter. This allows long integration times for signals having a low signal-to-noise ratio, for example.

An embodiment of the invention, in which complex correlation samples constitute the outputs of the matched filter, allows a coherent integrator to be implemented with a very simple structure such that it comprises an accumulator for summing up two or more correlation samples corresponding to the same phase difference of the input signal, whereby the sum corresponds to the correlation result calculated with one phase difference, the result having an integration time of $N_{MF} \cdot L_C$ samples, wherein $N_{MF}$ is the length of the matched filter in number of samples, and $L_C$ is the number of correlation samples summed up by the accumulator.

In an embodiment of the invention, the device further comprises a calculator for calculating the absolute values or estimates of the absolute values of the correlation samples given as outputs by the matched filter or the coherent integrator. This yields absolute or real values, which facilitates later processing and enables non-coherent integration.

In an embodiment of the invention, when the outputs of the matched filter or the coherent integrator are complex correlation samples, the calculator squares both components of the complex correlation sample, sums up the squared components and calculates the square root of the sum.

In another embodiment of the invention, the device also comprises an non-coherent integrator for integrating said absolute values or estimates of the absolute values of the correlation samples over an integration period that is longer than the length in time of the matched filter. This way, in the invention, the matched filter and the coherent integrator are able to carry out coherent integration as long as possible, and thereafter lengthen the integration time by non-coherent integration. An non-coherent integrator can be implemented by the same kind of simple structure as a coherent integrator.

According to still another embodiment of the invention, the device comprises a controller for gathering several comparison results corresponding to the same phase difference and reference signal and indicating if the output value of the matched filter, coherent integrator, absolute value calculator or non-coherent integrator exceeds or not a preset threshold value. The controller assumes that a signal is found if a preset portion of the gathered reference results indicates that the output value exceeds said threshold value. This verification allows said threshold value to be lowered so as to allow even weak signals to be better detected. In other words, the sensitivity of the acquisition system improves. The controller may be, for example, a software or hardware-based state machine.

The invention is preferably suited to digital implementations.

BRIEF DESCRIPTION OF THE FIGURES

The invention will now be described in greater detail by means of preferred embodiments with reference to the attached drawings, in which.

DETAILED DESCRIPTION OF THE INVENTION

In the present document, a complex signal refers to a signal composed of two signal components obtained by multiplying a received signal by a carrier replica and its 90° phase-shifted version. In other words, if the received signal r(t) is of the form:

$$r(t) = I(t) \cdot \cos(\omega_c t + \theta_0) - Q(t) \cdot \sin(\omega_c t + \theta_0)$$

wherein $\omega_c$, t and $\theta_0$ represent carrier frequency, time and an unknown constant phase term at time 0. I(t) and Q(t) constitute the above complex signal, which is expressed mathematically as:

$$z(t) = A(t) \cdot e^{j\phi(t)} = A(t) \cdot \cos(\phi(t)) + j \cdot A(t) \cdot \sin(\phi(t)) = I(t) + j \cdot Q(t)$$

Hence;

$$r(t) = Re(z(t) \cdot e^{j(\omega_c(t) + \theta_0)}) = Re(A(t) \cdot e^{j\phi(t)} \cdot e^{j(\omega_c(t) + \theta_0)})$$

The acquisition system according to the primary embodiment of the invention comprises four basic blocks: a data path block, a control block, a state machine and an I/O block. The data path block and state machine are described in more detail below.

Data Path Block

Figure 4:
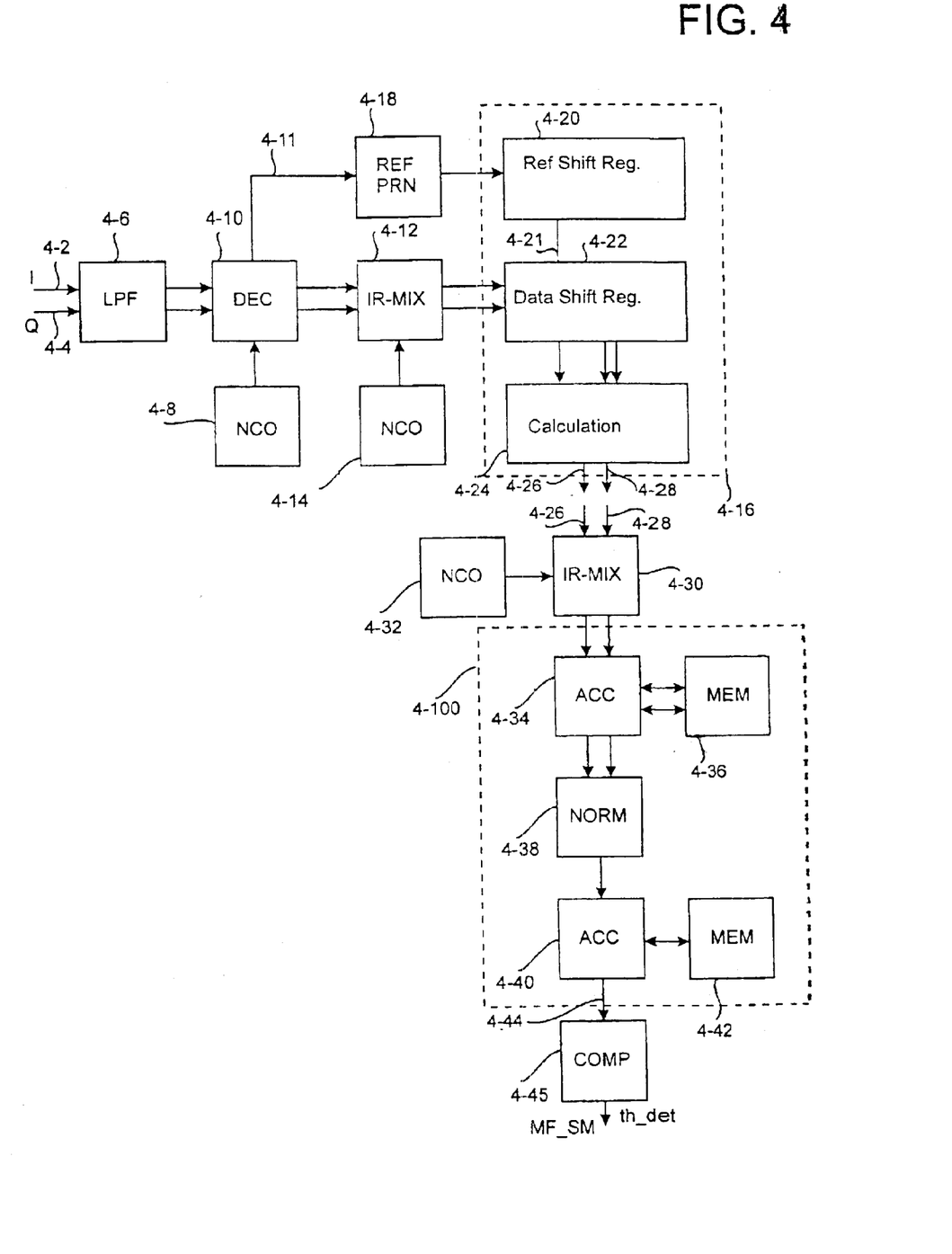
FIG. 4 is a block diagram illustrating a data path block according to a primary embodiment of the invention.

The data path block of a matched filter constitutes the core of an acquisition system and comprises, not only the data path of the implementation of the matched filter, but also blocks for processing an incoming signal. FIG. 4 illustrates an implementation of a data path block. The filter employed is of the low-pass type and its arithmetic is time-multiplexed to process both components of an incoming complex signal, hereinafter referred to as I (real part, in-phase) and Q (imaginary part, quadrature). In the present implementation, the length of the filter is $N_{MF}$ samples. As regards the acquisition application, it is the most preferable that the length of the filter is equal to the spreading code used, as is the case in the present implementation.

Before re-sampling, a sampled, complex signal 4-2 and 4-4 (I and Q signals), received from an RF front end and converted into digital, is filtered in a low-pass filter 4-6 to prevent aliasing. The sampling frequency of the complex signal 4-2 and 4-4 (I and Q signals) is higher than the sampling frequency used by the matched filter. This facilitates the implementation of re-sampling and improves the final accuracy of the quantization.

The signal is then re-sampled at a frequency controlled by a numerically controlled oscillator (NCO) 4-8 in a decimation element 4-10, which generates samples at the sampling frequency of the matched filter. The matched filter is so designed that its sampling frequency is a multiple of the chip frequency of a signal to be transmitted, and thus the same total number of samples corresponds to each transmitted chip in the matched filter.

A clock signal generated by the oscillator 4-8 is applied 4-11 to a pseudo random noise generator 4-18, which also generates a reference signal of the matched filter and whose output is clocked in a shift register 4-20, which stores the reference signal of the matched filter. A signal is clocked in the shift register 4-20 only when the acquisition system is initialized or the employed reference signal is to be changed.

The oscillator 4-8 serves to adjust the sampling frequency of the input of the matched filter such that the timing of the samples of the incoming signal corresponds to the timing of the reference signal.

The reference signal of a matched filter can also be generated in other ways, for example by replacing the shift register 4-20 with ROM memory, in which the reference signals used are stored. There may be more than one reference signal in use at the same time, whereby the system can be used for simultaneously searching for several signals.

In this case, the calculation of the matched filter is carried out time-multiplexed by changing the reference signal for each incoming sample.

The bandwidth of a matched filter is inversely proportional to the length of the filter. A usable signal band is approximately the inverse of the length of the filter, the length being given in seconds and the bandwidth in hertz. In order for the acquisition system to be able to search for signals whose frequency uncertainty is higher than the band of the matched filter, the frequency of an incoming signal is compensated for by using a multiplier 4-12, which implements complex multiplication with a complex carrier replica generated with a numerically controlled carrier frequency oscillator 4-14. The multiplier 4-12 and the oscillator 4-14 may also be located before the re-sampling. This enables processing of signal frequencies higher than the sampling frequency of the matched filter.

After the multiplication, the re-sampled and frequency-corrected samples are applied to a matched filter 4-16, which calculates their correlation with one or more reference signals. This is accomplished by loading the I and Q data streams in parallel in two shift registers in block 4-22. The signals in the data register are compared with at least one reference signal in a reference register 4-20 by correlating them with one another by means of calculation block 4-16.

The reference signal applied at each particular time from the reference shift register (or reference memory) 4-20 and from the data shift register 4-22, and the I and Q signals are thus compared in a multiplier and adder block 4-24. The comparison can take place with for example an XNOR gate (Exclusive Not Or), whose output is 1 if its two inputs are identical. After the comparison, $N_{MF}$ 1-bit data values exist, which are summed up to generate the final outputs of the matched filter for each sample. In the following, the function satisfied by the calculation block of the acquisition system is shown. The output out(i) of the matched filter is calculated separately with respect to the I and Q signal components.

$$\text{out}(i) = \sum_{n=0}^{N_{MF}-1} in(i-n) \cdot ref(n)$$

As results of the calculation, outputs 4-26 and 4-28 of the matched filter are obtained. At its simplest, the reference signal and the data signal are one-bit signals. In this case, the real signal obtains the values ±1, for which corresponding values 0 and 1 are used in the calculation. This way the multiplication can be carried out easily using the XNOR gate, whose output is 1 if its inputs are identical, as was stated above. In this case, the output value $N_{MF}$ corresponds to a complete correlation, and the value 0 to completely opposite signals. Hence, the formula for calculating out(i) becomes:

$$\text{out}(i) = 2 \cdot \left( \sum_{n=0}^{N_{MF}-1} (in1(i-n) XNOR refl(n)) \right) - N_{MF}$$

wherein in1(i) is an one-bit ith element of the data shift register of the filter, and refl(n) is an one-bit nth sample of the reference signal. The bit values correspond to negative and positive signal values in both cases.

In a matched filter, calculating the sum of several numbers is the most demanding task, and there are many ways to carry it out. Since the acquisition system of the present invention does not depend on the way the calculation is implemented in a matched filter, it will not be dealt with in greater detail herein.

The outputs 4-26 and 4-28 of the matched filter are complex signals, which correspond to the (cross)correlation of the incoming signal with the reference signals(s) as a function of time. If the signal to be correlated is periodic and the length of the period is $N_C$ samples, then periods of $N_C$ samples can be distinguished at the outputs 4-26 and 4-28, the periods corresponding to the different time differences of the cross correlation function. Since the signal is periodic, the expression phase differences of the signals can also be used, which has the same meaning. In the case of a multi-channel matched filter, the outputs of different channels corresponding to the same phase difference are in succession.

If the outputs 4-26 and 4-28 are studied at intervals of $N_C$ samples, they can be interpreted as $N_C$ separate signals, corresponding to each signal that is correlated with a different phase difference with the reference signal and whose sampling frequency is decimated to the $N_C$th part of the sampling frequency of the matched filter. Hence, the matched filter implements $N_{MF}$ parallel complex correlators and decimators, whose outputs are time-multiplexed as signals 4-26 and 4-28 and whose integration times are $N_{MF}$ samples.

The signal-to-noise ratio of the output of a correlator depends on the signal-to-noise ratio and integration time of an incoming signal. The longer the integration time, the better is the signal-to-noise ratio achieved at the output of the correlator. The length of a matched filter is limited for example by the fact that one output has to be calculated for each incoming sample, for which purpose a number of multiplications and additions corresponding to the executable length has to be carried out.

The integration time of a signal correlated in the data path block of the signal acquisition system of the spread spectrum receiver of the invention is increased in an integration part 4-100, which succeeds the matched filter and in which the integration takes place optionally in two steps. In the first step, the integration is continued coherently by means of blocks 4-34 and 4-36. Coherent integration means that the amplitude and phase of the complex signal to be integrated affect the integration result. This is achieved by summing up separately the real and imaginary parts of the complex signal. Coherent integration improves the signal-to-noise ratio linearly proportionately to the total integration time irrespective of the signal-to-noise ratio of the incoming signal.

Direct sequence spread spectrum systems usually employ binary phase shift keying (BPSK), in which the sign of the signal changes according to the data bits. If coherent integration is continued over the limit of the data bits, and the bit value changes, the result of the integration significantly worsens. Usually the average of the data transmitted is zero, which would also cause the result of coherent integration to be zero, should integration be continued indefinitely.

In BPSK, if the absolute value is taken of a complex signal, the effect of data disappears. After the absolute value operation, the value of the real signal is proportionate to the square of the power of the received signal, the value being composed of the sum of noise equivalent power and the possible sought signal. Lengthening the integration time allows the variance of the measurement result to be decreased, decreasing the necessary error marginal, which further improves the attainable sensitivity of the acquisition system.

Prior to coherent integration, the accuracy of the carrier estimate can be corrected again using the multiplier 4-30, which implements complex multiplication by a complex carrier replica generated by a numerically controlled carrier frequency oscillator 4-32. Correcting the carrier frequency in two steps is advantageous, since, owing to the lower sampling frequency, the latter oscillator requires a considerably smaller number of bits as regards frequency accuracy. Another reason is that after a matched filter, several parallel integration blocks can be implemented, each operating at different carrier frequencies using a common matched filter to form correlations. Post-integration is easy to implement, compared with an actual matched filter, which makes this an advantageous manner of shortening the necessary total search time.

In the second step, blocks 4-40 and 4-42 carry out the integration non-coherently. Non-coherent integration means that only the amplitude of the complex signal to be integrated affects the integration result. This is accomplished by summing up the absolute value of the complex signal, which makes the phase information disappear. Non-coherent integration improves the signal-to-noise ratio nonlinearly proportionately to the total integration time depending on the signal-to-noise ratio of the incoming signal. At signal-to-noise ratios less than one, there is only slight improvement when the integration time is lengthened. This is why coherent integration should be continued as long as possible. Limitations of a coherent integration time include a narrowing bandwidth, which requires increasingly more accurate frequency adjustment of the carrier replica, and optional data modulation in the signal.

Coherent integration takes place in block 4-34, and uses a memory block 4-36 to store provisional results. Block 4-36 serves to allow integration periods longer than the length $N_{MF}$ of the matched filter 4-16. This is accomplished by storing the outputs obtained from the matched filter 4-16 in a memory 4-36 and summing up several $L_C$ samples corresponding to the same phase difference in an accumulator 4-34. Each of these sums corresponds to a correlation result calculated with one phase difference, the integration time of the result being $N_{MF} \cdot L_C$ samples. Since the summing up is performed on the complex outputs 4-26 and 4-28 of the matched filter, it is coherent, i.e. signal phase affects the obtained result.

Coherent integration thus takes place by first loading from the memory 4-36 a complex value corresponding to said correlation phase of the matched filter, to which value the result of the multiplier 4-30 is summed up, and the sum is stored in the same memory location. Once the desired number of samples is summed up, the sum is applied further from the integration block, and the sum in the memory is zeroed. Alternatively, zeroing may also take place when the first value is read from the memory for the summing.

A norming block 4-38 calculates the absolute value (of the complex number) from the coherently integrated samples obtained from block 4-36 or directly from the output samples of the matched filter 4-16. The absolute value of complex number z is calculated in accordance with formula $$|z| = \sqrt{Re(z)^2 + Im(z)^2}$$

wherein Re(z) is the real part of complex number z and Im(z) its imaginary part. Since the calculation of a square root function is a heavy operation, its exact value can be replaced by a suitable estimate that is easier to calculate. Two relatively good estimates are the square of the absolute value, wherein the square root function is not calculated at all, and the sum of the absolute values of the real and imaginary parts. The advantage of the latter estimate is also that the number of bits required by the estimate is the same as the number of bits required by the second component of the complex number.

The real signal obtained from the output of block 4-38 can thus be integrated non-coherently in block 4-40, which uses memory block 4-42 for storing provisional results. Integration takes place by first loading from the memory the value of the subtotal corresponding to said correlation phase of the matched filter, to which value the result of block 4-38 is summed up, and the sum is stored in the same memory location. Once the desired number of samples is summed up, a sum 4-44 is applied further from the integration block, and the sum in the memory is zeroed. Alternatively, zeroing may also take place when the first value is read from the memory for the summing.

The size of both memories 4-36 and 4-42 required in the integration is $N_{MF}$ samples. In the memory 4-36 the samples are complex numbers, and in the memory 4-42 the samples are real numbers.

Finally, samples 4-44 obtained from the acquisition system are compared in a comparator COMP 4-45 with a preset threshold value, and the comparison result is applied to a search algorithm. The search algorithm may be implemented for example as a state machine or as software. To increase the probability of the right decision and to decrease the probability of wrong decisions, optional exceeding of the threshold values is still verified by comparing several comparison results corresponding to the same phase difference.

If sufficiently many comparisons exceed the threshold value, the probability that the signal was found is high. The use of a verification algorithm allows the threshold value to be lowered so as to find even weak signals. In this respect, a verification algorithm can even completely replace non-coherent integration in some cases. Furthermore, if the incoming signal-to-noise ratio is sufficiently high, and the length of the matched filter sufficient, coherent integration and the preceding multiplication by the carrier replica can be omitted, and the signal can be applied from the matched filter directly to the absolute value calculation block 4-38.

Since in a general case the frequency uncertainty of a receiver exceeds the total bandwidth ($1T_I$) of the data path, a received signal has to be searched for using several frequency values. For this reason, the carrier frequency can be adjusted when the phase inaccuracy of the entire spreading code has been gone through. The search can be controlled either by means of a state machine or using a search program run in a separate processor.

The time required by the search can be shortened without shortening the integration time by adding several parallel post-integration blocks 4-100. However, this is subject to remaining within the bandwidth of the matched filter.

In systems where the movement of a transmitter and a receiver with respect to each other is rapid, a Doppler shift is created in the carrier and the spreading code, the magnitude of the shift depending on the frequency of the signal component. Consequently, variation in the frequency of the spreading code, due to the Doppler shift, has to be taken into account in the acquisition system if the required integration time ($T_I$) is long. If the inaccuracy caused by the Doppler shift in the frequency exceeds $1T_I$, then the timing of the code changes more than one chip during the integration. However, the acquisition system of the invention and its preferred embodiments are capable of operating also under these circumstances by adjusting the frequency of the oscillator 4-8 generating the sampling frequency of the matched filter.

Generally speaking, a direct-mixed spread spectrum signal is periodic, as far as the code is concerned, the length of the period being equal to the length of the code. The signal is sampled in a receiver (before the matched filter) at a sampling frequency $F_s$. Consequently, in a received signal, the periodicity appears at an interval of $N_C$ samples. When the length of the matched filter is assumed to be less than or equal to the length of the spreading code, and is expressed as samples by $N_{MF}$, the following equation is valid: $N_C = N_{MF}$.

It is advantageous to have $N_C = N_{MF}$ in an acquisition system, since in that case all code phases can be acquired at a time. Forgetting the effects of the noise in a receiver and the inaccuracies in carrier and clock oscillators, it may be said that, after the matched filter, the signal is still periodic at an interval of $N_C$ samples. Particularly, if $N_C = N_{MF}$, i.e. the length of the filter equals the length of the entire code, its output shows a clear maximum in the absolute value of the signal at intervals of $N_C$ samples. If, in this case, outputs are summed up such that output values at intervals of $N_C$ samples are summed up, the maximum signal can be further amplified. Consequently, $N_{MF}$ sums are obtained as the result, and they are formed as follows:

$$S(n) = \sum_{i=0}^{N_S-1} \text{out}(i \cdot N_c + n), \quad 0 \leq n < N_{SUM} = N_{MF}$$

Herein, $N_S$ is the number of summed-up multiples, out(i) is the output of the matched filter at the sampling moment i, and $N_{SUM}$ is the number of different sums.

Altogether $N_S \cdot N_C$ samples are used in the summing, to each of which $N_S$ output values of the matched filter are picked. If the length of the filter is less than the length of the code, some of its outputs have to be ignored. The above formula also shows that the summing requires an accumulator for each desired sum. Alternatively, the outputs of the filter have to be stored in a memory to wait for the summing. As a minimum, the operation requires $N_{SUM}$ memory locations for storing the provisional results of the summing.

The summing can be carried out for example in accordance with the following algorithm:

i:=0
while i<$N_S \cdot N_C$ do
  index:=mod (i, $N_C$)
  if (index<$N_{Sum}$) then
    accu[index]:=accu[index]+MF_output(i)
  endif
  i:=i+1
enddo wherein mod (I, n) gives the remainder of i/n.

If the output of the matched filter is a complex signal, the accu and summing functions also have to be complex. After the execution of the algorithm, accu [n] equals S(n).

If we assume, for the sake of simplicity, that the sampling frequency of the matched filter is equal to the chip frequency of the code, then the multipliers of a low-pass type of filter are of the form: $c(i) = \text{PRN}(N_C - \text{mod}(I, N_C))$, wherein PRN(j) is the jth chip of the code. Accordingly, if the length of the filter is a multiple of the length of the code ($N_{MF} = N_S \cdot N_C$), we notice that its multipliers $c(k \cdot N_C)$ are equal. In this case the output of the matched filter is:

$$\text{out}(i) = \sum_{n=0}^{N_{MF}-1} \text{in}(i-n) \cdot c(n)$$

If $N_{MF} = N_S \cdot N_C$ this can also be expressed as:

$$\text{out}(i) = \sum_{k=0}^{N_S-1} \left( \sum_{j=0}^{N_C-1} \text{in}(i - k \cdot N_C - j) \cdot c(j) \right)$$

The above formula presents continuous integration from the output of an $N_C$ long matched filter over the length of $N_S$ codes. This can also be presented the other way around, i.e. by integrating $N_S$ outputs at intervals of $N_C$ samples, an output corresponding to an $N_S \cdot N_C$ long matched filter is obtained:

$$\text{out}(i) = \sum_{j=0}^{N_C-1} \left( \sum_{k=0}^{N_S-1} \text{in}(i - k \cdot N_C - j) \right) \cdot c(j)$$

If $N_{MF} < N_C$, post-integration can be used to obtain the same benefit, but the attenuating effect on the noise of the filter is less than could be deduced from an $N_S \cdot N_C$ long integration time, since part of the incoming information cannot be utilized.

State Machine Block

Figure 5:
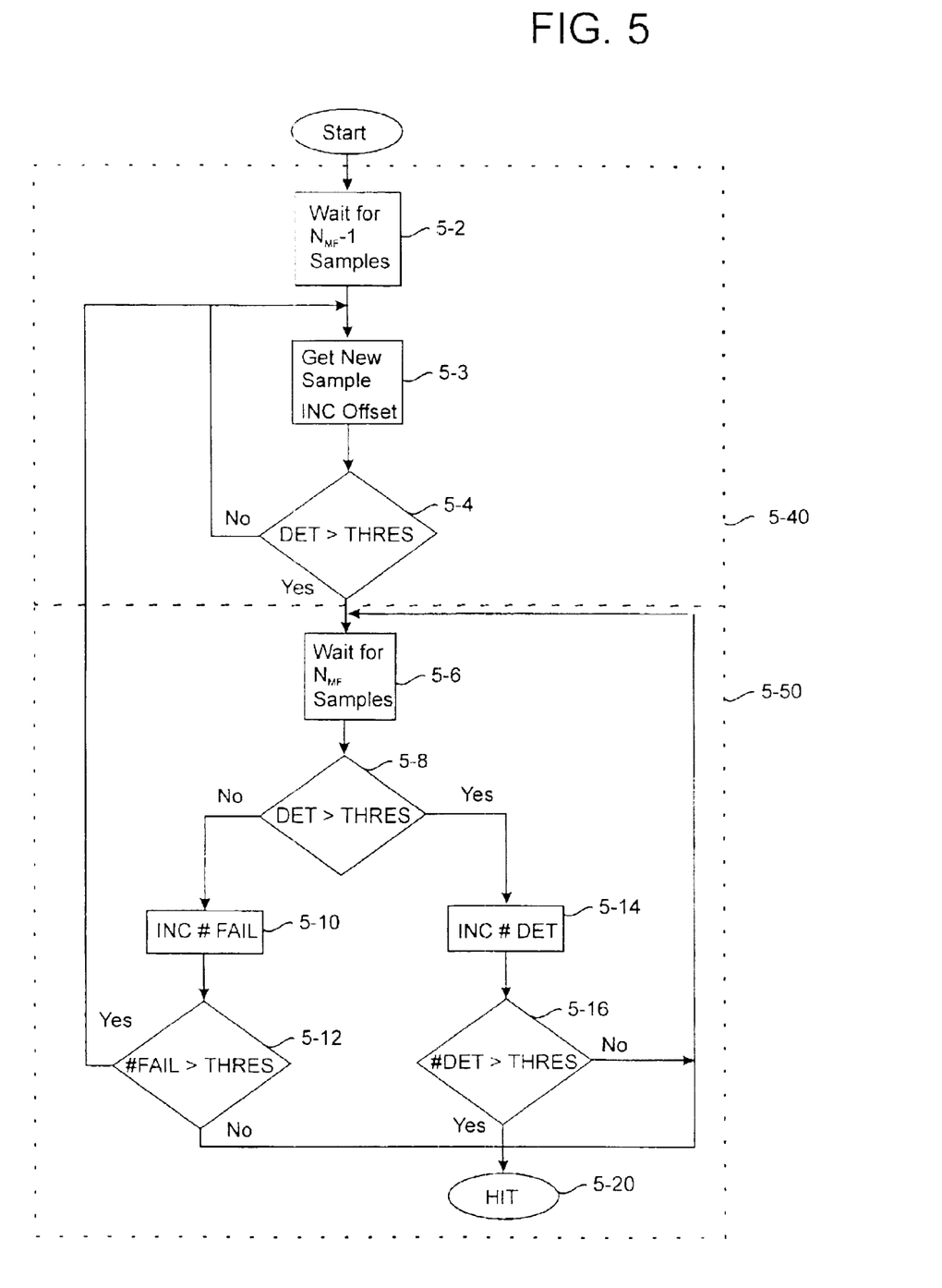
FIG. 5 is a functional flow diagram of an acquisition system according to an embodiment of the invention.

In the primary embodiment of the invention, the above acquisition system using a matched filter can be controlled by a state machine, which attends to the implementation of the verification algorithm and the sweeping of the carrier frequencies for searching for several frequency offsets. An example of a functional flow diagram of a state machine and an acquisition system is shown in FIG. 5. Herein, the length of the filter is $N_{MF}$ samples.

In step 5-2, one sample at a time is loaded from an incoming signal into a data register. Since the length of the matched filter is $N_{MF}$ samples, $N_{MF}-1$ samples are loaded into the register. In step 5-3, still another new sample is loaded into the register, i.e. the last sample of the incoming signal, i.e. sample $N_{MF}$. In step 5-4, the data in the shift register is compared with a code replica, or reference, signal. If the correlation does not exceed a set threshold value, in step 5-3 the next sample is loaded into the register from the incoming signal. In the simplest case, exceeding the threshold value means that the signal corresponding to said reference signal is detected and its spreading code is in phase with the stored reference signal. This information is used to initiate actual signal tracking and reception. However, if the strength of the received signal is low as compared with noise, simply exceeding the threshold value is not sufficient to prove that the signal was found. For this reason, an algorithm can be used to verify the finding, whereby after the exceeding of the first threshold value a new incoming signal is loaded into the shift register and correlated with the reference signal with the matched filter in a step corresponding to the point in time of the first finding.

Accordingly, if the reference value exceeds the set threshold value, the right phase of the code signal is potentially found, and the system transfers from signal tracking state 5-40 to a signal found verification state 5-50. Here, in step 5-6, the system first waits for $N_{MF}$ samples, and then repeats the comparison in step 5-8.

If the value is less than the threshold value, the value of register FAIL is incremented by one unit in step 5-10, the next step being 5-12. Here, the value of the register FAIL is compared with a set maximum value, which indicates the allowed number of times below the threshold value. If the number of comparison results below the threshold value exceeds a limit value set, the process returns to step 5-3. Otherwise, the next step is 5-6.

If the threshold value is exceeded, the value of register DET is incremented by one unit in step 5-14, the next step being 5-16. Here, the value of the register DET is compared with a set maximum value, which indicates the allowed number of times the threshold value has to be exceeded before the signal can be declared found. If the number of comparison results exceeding the threshold value does not exceed a limit value set, the process returns to step 5-6.

The process continues as above until the number of samples exceeding or below the threshold value exceeds a preset, at least one number/threshold value. Then, in step 5-20, the signal can be declared found, or, alternatively, the search is continued from the next data sample in step 5-3.

After verification of all code phases, the frequency of the carrier replica oscillator is changed and the search process is repeated starting from the loading of $N_{MF}-1$ samples into the shift register (step 5-2). Once the search process has been repeated at all frequencies to be searched, the frequency is set at its initial value, and the search is repeated.

If generators tied down to one frequency reference generate the carrier frequency of a receiver and the clock frequency of a spreading code in a direct sequence system, then the offset of the carrier frequency can also be used to calculate the required adjustment value for the sampling clock of the matched filter. Otherwise, the sampling frequency of a matched filter has to be adjusted with another algorithm. However, the Doppler shifts of the carrier and spreading code are directly proportional in relation to their frequencies.

A state machine processes the outputs of a matched filter. For each channel are needed:
1. a state variable indicating the current state;
2. a counter for implementing a $N_{MF}$ long delay at the beginning and during verification of the found signal; and
3. a status variable indicating, among other things, the current code phase, which is given as the output if the signal is found.

A variable including information on the current carrier frequency of the signal to be found is common for the channels in this implementation.

Figure 6:
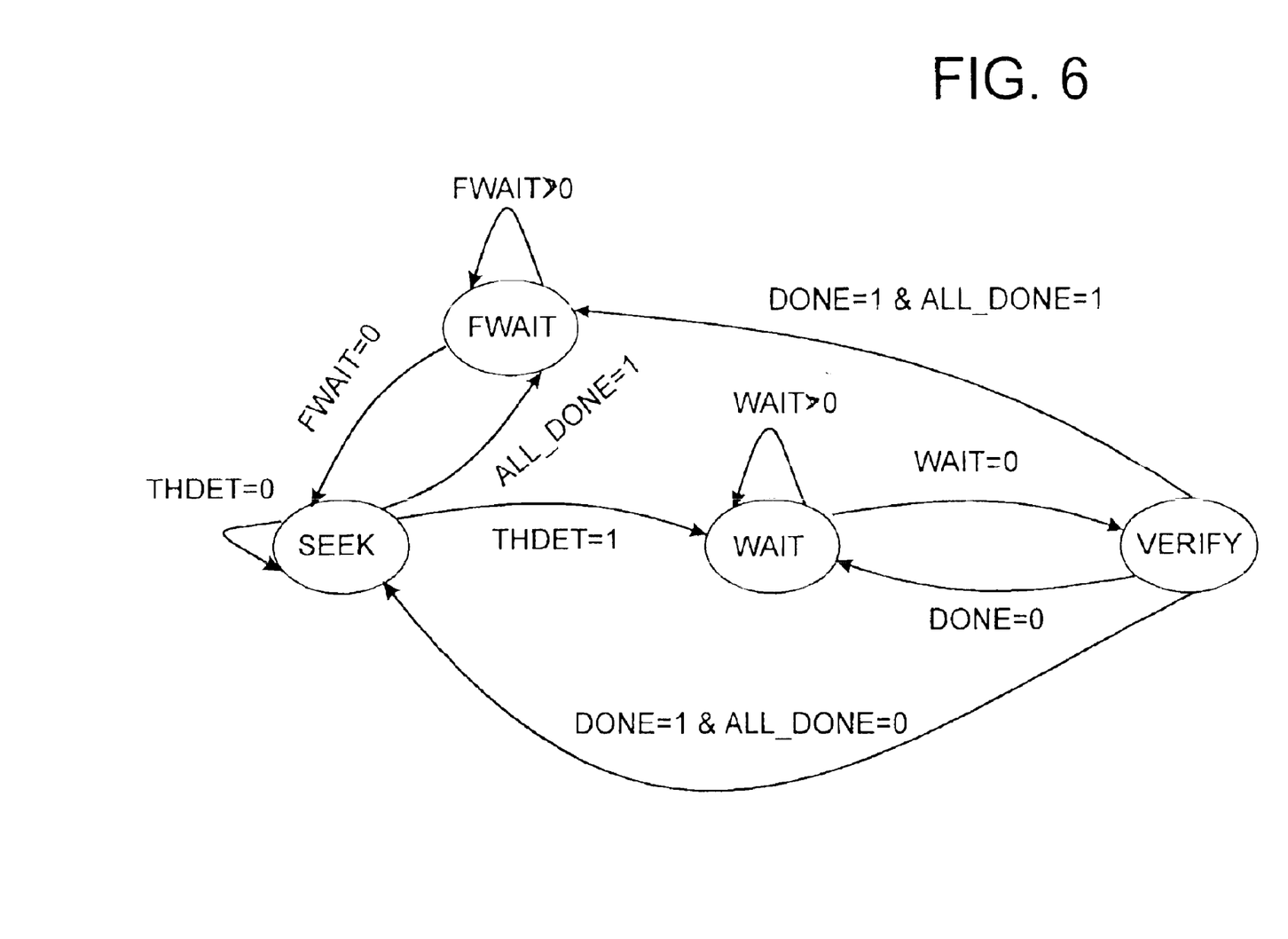
FIG. 6 shows the state diagram of a state machine according to an embodiment of the invention.

FIG. 6 shows the state diagram of a state machine controlling the search process according to the primary embodiment of the invention. The state machine has two active states and two states used for waiting. The initial state is an fwait state, in which new data is clocked to shift registers. In this state, waiting takes as many sample clock cycles as there are bits in the shift register, i.e. $N_{MF}$ samples. Having waited for sweeping, the process enters the seek state. In this state, the output of the threshold value detector is checked for each sample, and if the threshold value is exceeded, the next state, verify wait, is entered, the DET counter is set to one and the FAIL counter to zero. If no exceeding of the threshold value occurred for any code offset ($N_{MF}$ samples), the state machine sets a DONE flag for the current channel. Once all state machine channels are verified for each possible code phase offset, i.e. when all DONE flags are set, and all carrier frequencies to be searched have been gone through, the fwait state is re-entered.

In the verify wait state the state machine waits till completely new data is clocked inside the data shift register to improve the statistical quality of the detection, and a new comparison is carried out using the same code offset. To ensure signal detection, the threshold value comparisons are repeated several times in the same code offset state. After a wait of the length of a code ($N_{MF}$ samples) in the verify wait state, the verify state is entered. In this state, the value of the threshold value detector is checked, and if detection is indicated, the DET counter is incremented by one. Otherwise, the FAIL counter is incremented by one. If the numbers of hits (DET) and failures (FAIL) are still below their maximum values, the verify wait state is re-entered. Otherwise, if the number of hits (DET) exceeds the maximum value, the signal is declared found and the current PRN code, frequency and code offset are given as the output of the acquisition system. After the last verification, there are two outcomes. If the code offset is the last one, the frequency is changed and the -fwait state is entered. Otherwise, the seek state is entered, and the search is continued as usual.

A state machine sweeps between the low and high limit values of a local oscillator frequency (LO) in configurable steps. The frequency range searched for is composed of a fixed intermediary frequency (IF) and a Doppler frequency. These limit values are set according to the actual RF (Radio Frequency) front-end intermediary frequency (IF) and the maximum expected Doppler shift. State machines also have a method of setting the acquisition into its initial state. When a multi-channel matched filter is used, the state machine sees to it that the frequency search does not take place until all channels have once gone through all phase differences. In other respects, the different channels operate completely irrespective of each other. This ensures the best advantage obtained from parallelism.

As was described above, in the system and method of the invention and its preferred embodiments, problems caused by a long integration time, timing and coherent and non-coherent integration have been solved, and the acquisition system of the invention and its embodiments independently searches for the code phase and frequency estimate corresponding to a given reference signal.

It is obvious to a person skilled in the art that as technology advances, the basic idea of the invention can be implemented in a variety of ways. The invention and its embodiments are thus not limited to the above examples, but may vary within the claims.

What is claimed is:

1. A device for detecting a demodulated signal received by a spread spectrum receiver and converted into a demodulated digital sample signal, the device comprising:
   a matched filter for calculating a correlation between an incoming signal and at least one reference signal;
   an oscillator for generating a sampling frequency;
   a sampling circuit for re-sampling said demodulated digital sample signal at said sampling frequency, which is such that the timing of samples of a sample signal going from the sampling circuit to the matched filter corresponds to the timing of the at least one reference signals of the matched filter; and
   a multiplier in which the sample signal is multiplied by a carrier replica generated locally before the sampling circuit or thereafter, to remove the carrier from the sample signal.

2. A device as claimed in claim 1, wherein the sampling frequency generated by said oscillator is adjustable such that the timing of a sample signal going from the sampling circuit to the matched filter corresponds to the timing of samples of the at least one reference signals of the matched filter.

3. A device as claimed in claim 1 or 2, wherein the device comprises one or more coherent integrators for integrating correlation samples generated as outputs by the matched filter over an integration period that is longer than the length in time of the matched filter.

4. A device as claimed in claim 3, wherein the outputs of the matched filter are complex correlation samples, and that the coherent integrator comprises an accumulator for summing up two or more correlation samples corresponding to the same phase difference of the incoming signal, the sum corresponding to a correlation result calculated with one phase difference and whose integration time is NMF·LC samples, wherein NMF is the length of the matched filter in number of samples, and LC is the number of correlation samples summed up by the accumulator.

5. A device as claimed in claim 3, wherein the device comprises a calculator for calculating the absolute values or estimates of the absolute values of the correlation samples given as outputs by the matched filter or the coherent integrator.

6. A device as claimed in claim 5, wherein the outputs of the matched filter or the coherent integrator are complex correlation samples, and that said calculator calculates the absolute value or an estimate of the absolute value of a complex correlation sample.

7. A device as claimed in claim 5, wherein the device comprises one or more non-coherent integrators for integrating said absolute values or estimates of the absolute values of the correlation samples over an integration period that is longer than the length in time of the matched filter.

8. A device as claimed in claim 7, wherein the non-coherent integrator comprises an accumulator for summing up two or more absolute values or an estimates of the absolute values of a correlation sample corresponding to the same phase difference of the incoming signal, the sum corresponding to a correlation result calculated with one phase difference and whose integration time is NMF·LC samples, wherein NMF is the length of the matched filter in number of samples, and LC is the number of correlation samples summed up by the accumulator.

9. A device as claimed in claim 7, wherein the device comprises a comparator, which compares output values of the matched filter, the coherent integrator, the calculator or the non-coherent integrator with a predetermined threshold value, and gives a reference result that indicates if the output value exceeds or not said threshold value.

10. A device as claimed in claim 9, wherein the device comprises a controller for gathering several comparison results corresponding to the same phase difference and reference signal, and which, in response to a preset portion of the gathered reference results indicating that the output value exceeds said threshold value, assumes that a signal is found.

11. A device as claimed in claim 1, wherein the device comprises a controller for adjusting said oscillator to generate a sampling frequency for searching for a correlation at different phase differences of a received signal.

12. A device as claimed in claim 1, wherein the device is multichannel and searches time-dividedly in parallel for two or more received signals.

* * * * *